(12) United States Patent
Amirault

(10) Patent No.: US 6,676,212 B1
(45) Date of Patent: Jan. 13, 2004

(54) CHILD CAR SEAT HAVING AN ADJUSTABLE ARMREST

(75) Inventor: David Amirault, Troy, OH (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 10/218,823

(22) Filed: Aug. 14, 2002

(51) Int. Cl.⁷ .................................................. A47C 7/54
(52) U.S. Cl. ................................ 297/250.1; 297/411.36
(58) Field of Search ......................... 297/411.36, 250.1, 297/411.35

(56) References Cited

U.S. PATENT DOCUMENTS

| | | | | |
|---|---|---|---|---|
| RE19,721 E | * | 10/1935 | Genung | |
| 2,625,987 A | * | 1/1953 | Hunter | |
| 3,136,579 A | * | 6/1964 | Hunter | |
| 3,409,326 A | | 11/1968 | Kerner | 297/384 |
| 4,568,122 A | | 2/1986 | Kain | 297/488 |
| 4,657,305 A | * | 4/1987 | Meiller | |
| 4,743,063 A | | 5/1988 | Foster, Jr. | 297/130 |
| 4,874,203 A | | 10/1989 | Henley | 297/250 |
| 4,893,827 A | * | 1/1990 | Gay et al. | |
| 5,294,182 A | | 3/1994 | Colasanti | 297/467 |
| 5,328,233 A | | 7/1994 | Maule | 297/115 |
| 5,332,286 A | | 7/1994 | Atherton et al. | 297/256.11 |
| 5,568,959 A | | 10/1996 | Weber et al. | 297/238 |
| 6,045,183 A | * | 4/2000 | Weber | |
| 6,474,735 B1 | * | 11/2002 | Carnahan et al. | |

* cited by examiner

Primary Examiner—Milton Nelson, Jr.
(74) Attorney, Agent, or Firm—Taft, Stettinius & Hollister LLP

(57) ABSTRACT

A child car seat includes a child-car-seat shell and an armrest. The armrest is attached to the shell. The armrest is adjustable for height at least between a first position and a second position.

6 Claims, 4 Drawing Sheets

CHILD CAR SEAT HAVING AN ADJUSTABLE ARMREST

TECHNICAL FIELD

The present invention relates generally to child car seats, and more particularly to a child car seat having an adjustable armrest.

BACKGROUND OF THE INVENTION

Known seats include office furniture chairs for adults, wherein the chairs have height-adjustable armrests, and include child car seats for babies, infants, and young children.

Conventional child car seats include those which are removably installed in a vehicle by use of the vehicle's seat belts, such as by use of the vehicle's lap belts or by use of the vehicle's lap and shoulder belts. The child is secured in the installed seat by use of separate harness belts attached to the car seat or by use of the same vehicle seat belts being used to install the car seat in the vehicle. It is noted that child car seats are not limited to cars but can be used in any vehicle having vehicle seat belts. It is further noted that a child car seat designed or used without separate harness belts is sometimes referred to as a child booster seat. Some child car seats are designed to be installed in the vehicle with the child car seat facing forward for children of older age and/or heavier weight. Other child car seats are designed to be installed in the vehicle with the child car seat facing rearward for children of younger age and/or lighter weight. Still other child car seats are convertible seats allowing installation in the vehicle with the child car seat facing forward or installation in the vehicle with the child car seat facing rearward to accommodate different seat-facing positions as the child grows.

Known child car seats include those having armrests. Typically, the child's arms rest on the top surface (padded or not) of the side portions of the child-car-seat shell. In one conventional child car seat, the armrest is pivotable. The armrest is pivoted upward when the child enters or exits the child car seat or when the child is placed in, or is removed from, the child car seat. The armrest is pivoted to a horizontal use position when the child is secured in the child car seat.

What is needed is an improved child car seat.

SUMMARY OF THE INVENTION

A first expression of an embodiment of the invention is for a child car seat and includes a child-car-seat shell and an armrest. The armrest is attached to the shell. The armrest is adjustable for height at least between a first position and a second position.

A second expression of an embodiment of the invention is for a child car seat having a child-car-seat shell, a bracket, and an armrest. The shell has a side portion. The bracket is attached to the side portion. The armrest is attached to the bracket, and the armrest is adjustable up and down for height relative to the bracket.

A third expression of an embodiment of the invention is for a child car seat having a child-car-seat shell, a bracket, and an armrest. The shell has a side portion. The bracket is attached to the side portion. The armrest is attached to the bracket, and the armrest is adjustable up and down for height relative to the bracket. The bracket has a clamp portion attached to the side portion of the shell and has a boss portion extending from the clamp portion, and wherein the boss portion includes a spring tab. The armrest is positioned surroundingly over the boss portion and has a sidewall including spaced-apart slots of different slot heights. The spring tab is biasingly engaged with an aligned one of the slots. The spring tab is disengagable from the aligned one of the slots allowing the armrest to be manually moved up or down relative to the bracket to bring another one of the slots into alignment with the spring tab. The slots are positioned in a first column, there is also included a second column of slots, and the spring tab has a first projection biasingly engaged with an aligned one of the slots of the first column and has a second projection biasingly engaged with an aligned one of the slots of the second column. The sidewall also includes an elongated access hole between the first and second columns, and the spring tab also includes a push button disposed in the elongated access hole. The clamp portion of the bracket has first and second arms which surround the side portion of the shell in a snap fit.

Several benefits and advantages are derived from one or more of the expressions of an embodiment of the invention. Having height-adjustable armrests for a child car seat allows the child car seat to better fit children of different sizes and allows the same car seat to better fit a child as the child grows. Having height-adjustable armrests for a child car seat also allows, in one example, the armrests to be positioned closer to the child-car-seat shell for easier child ingress and egress while allowing the armrests to be positioned at a higher more comfortable position for the child when the child is secured in the child car seat.

DESCRIPTION OF THE PREFERRED EMBODIMENTS

Figure 1:
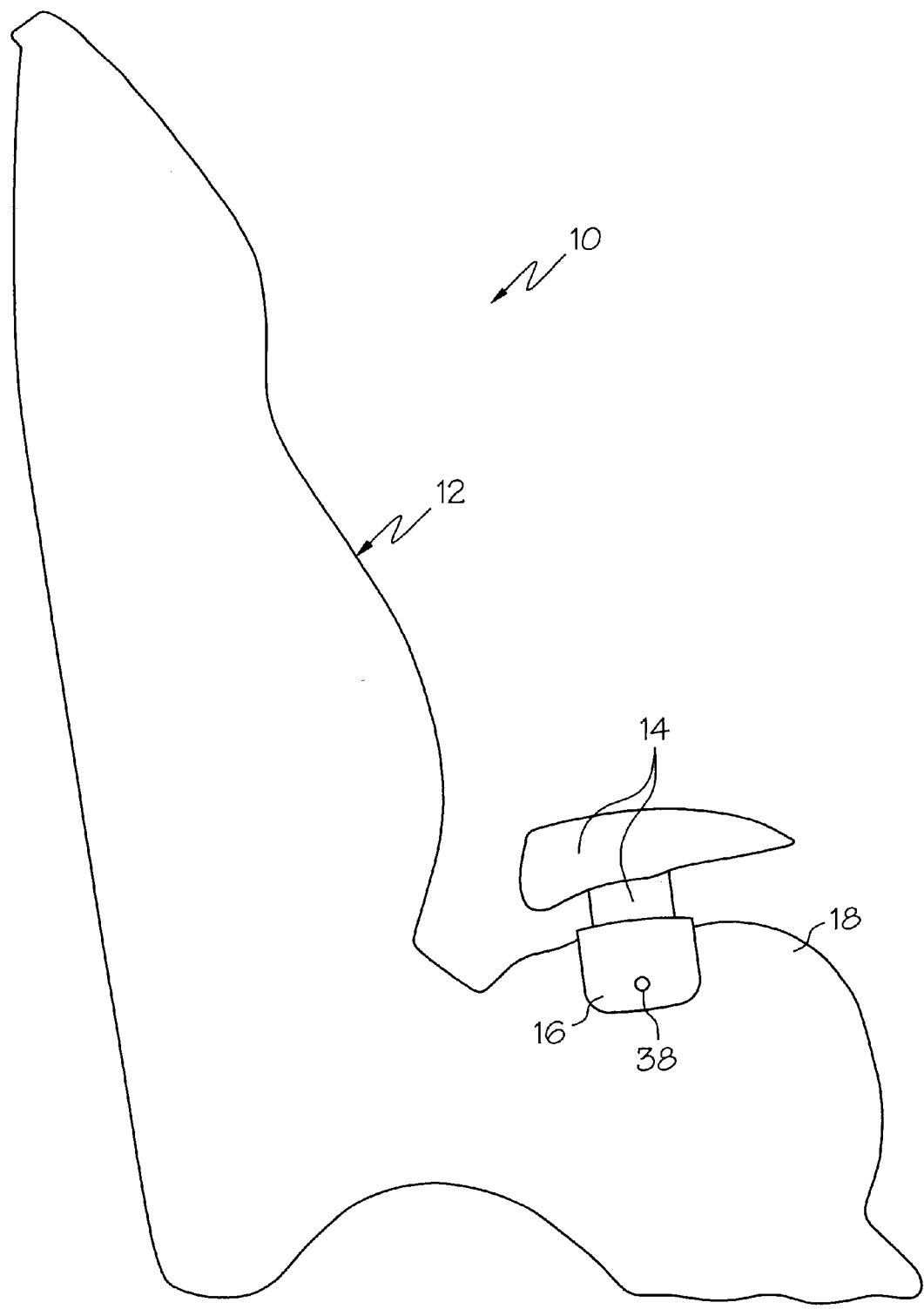
FIG. 1 is a side elevational view of an embodiment of the child car seat of the invention showing an armrest which is attached to a bracket which is attached to a side portion of a child-car-seat shell, wherein the armrest is shown in its lowest position.

Referring now to the drawings, FIGS. 1–4 illustrate an embodiment of the present invention. A first expression of the embodiment shown in the figures is for a child car seat 10. The term "child" includes a baby, an infant, and a child. The terminology "child car seat" includes, without limitation, child car seats which use the vehicle lap and/or shoulder belt to secure the child car seat to the vehicle and which have a separate child harness to secure the child in the child car seat, child car seats (sometimes called booster seats because they raise a child to a proper seating height for the vehicle shoulder belts) which use the vehicle lap and shoulder belts to secure the child in the child car seat and to secure the child car seat to the vehicle, and child car seats which can be used with a separate child harness when the child is younger and which can be used without a separate child harness when the child is older. The terminology "child car seat" includes forward and rearward facing child car seats. It is noted that the child car seat 10 is not limited for use with cars but can be used in any vehicle (including, without limitation, cars, trucks, busses, boats, planes, and trains).

In the first expression of the embodiment shown in the figures, the child car seat 10 includes a child-car-seat shell 12 and an armrest 14 attached to the shell 12. The term "attached" includes directly attached and includes indirectly attached, as can be appreciated by the artisan. The armrest 14 is adjustable for height at least between a first position and a second position. It is noted that the first position is a first armrest-use position usable by a suitably-sized child as an armrest and that the second position is a second armrest-use position usable by a suitably-sized child as an armrest. In one implementation, the first and second positions are discrete positions. In a different implementation, the first and second positions are arbitrary within a continuous range of possible positions.

In one example of the first expression of the embodiment shown in the figures, the armrest 14 remains in substantially the same orientation with respect to the shell 12 in the first and second positions. In one variation, the armrest 14 provides a substantially horizontal arm support in the first and second positions when the child car seat 10 is installed in a vehicle (not shown). In a different variation, the armrest provides a sloped arm support in the first and second positions when the child car seat is installed in a vehicle. In a different example, not shown, the armrest changes orientation in the first and second positions. Mechanisms for changing armrest orientation in the first and second positions are left to the artisan.

In one enablement of the first expression of the embodiment shown in the figures, the armrest 14 remains attached to the shell 12 during the adjustment for height between the first and second positions. In a different enablement, not shown, the armrest in its first position is detached from the shell, then moved to the second position, and then re-attached to the shell. Apparatus for attaching and detaching an armrest at different heights and for changing heights of an armrest while the armrest remains attached are left to the artisan.

In one application of the first expression of the embodiment shown in the figures, the armrest 14 moves in a substantially straight path during the adjustment for height between the first and second positions. In a different application, not shown, the armrest moves in a curvilinear path during the adjustment for height between the first and second positions. Mechanisms for adjusting the height of an armrest by moving the armrest, or allowing the armrest to move, in a substantially straight or curvilinear path are left to the artisan.

In a second expression of the embodiment shown in the figures, the child car seat 10 includes a child-car-seat shell 12, a bracket 16, and an armrest 14. The shell 12 has a side portion 18. The bracket 16 is attached to the side portion 18. The armrest 14 is attached to the bracket 16, and the armrest 14 is adjustable up and down for height relative to the bracket 16.

In one example of the second expression of the embodiment shown in the figures, the bracket 16 has a clamp portion 20 attached to the side portion 18 of the shell 12 and has a boss portion 22 extending from the clamp portion 20. The boss portion 22 includes a spring tab 24. In one design, the spring tab is formed by a cutout in a wall of the boss portion 22. In the same or a different design, the boss portion 22 and the clamp portion 20 are monolithic portions of the bracket 16.

Figure 2:
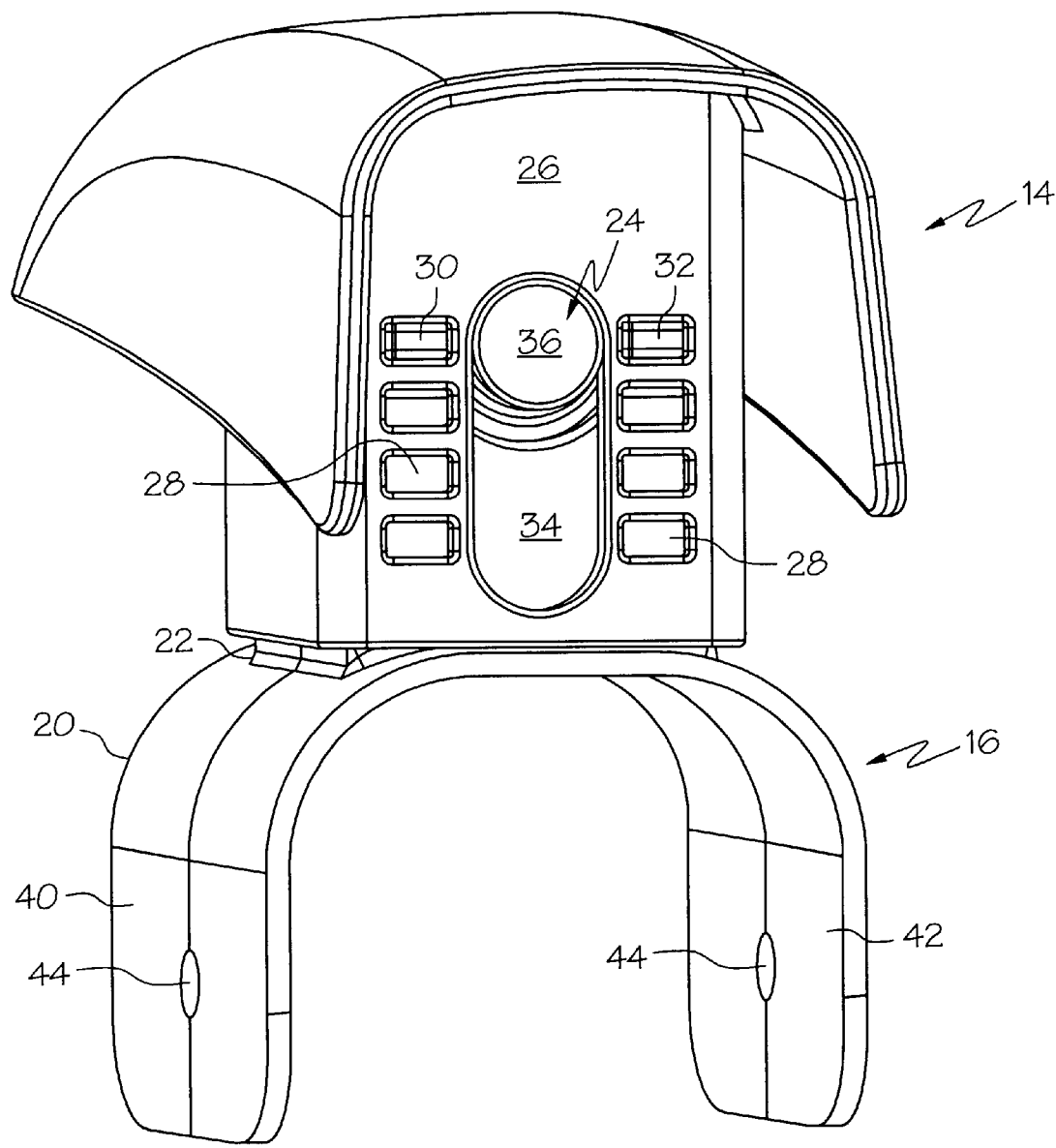
FIG. 2 is a perspective view of the back of the armrest and bracket assembly of FIG. 1, wherein the bracket has been removed from the child-car-seat shell.
Figure 3:
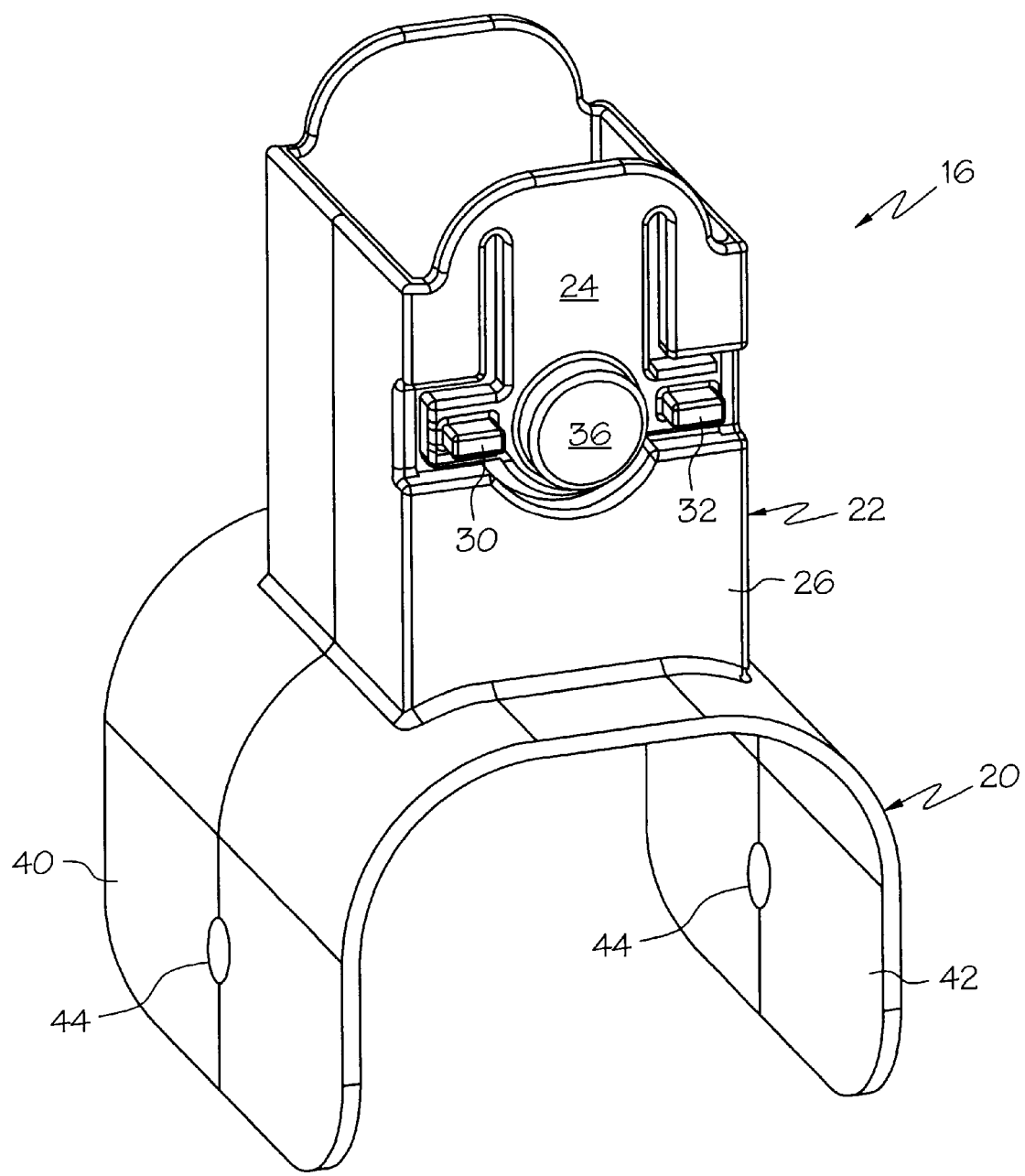
FIG. 3 is a perspective view of the bracket of FIG. 2, wherein the armrest has been removed from the bracket.
Figure 4:
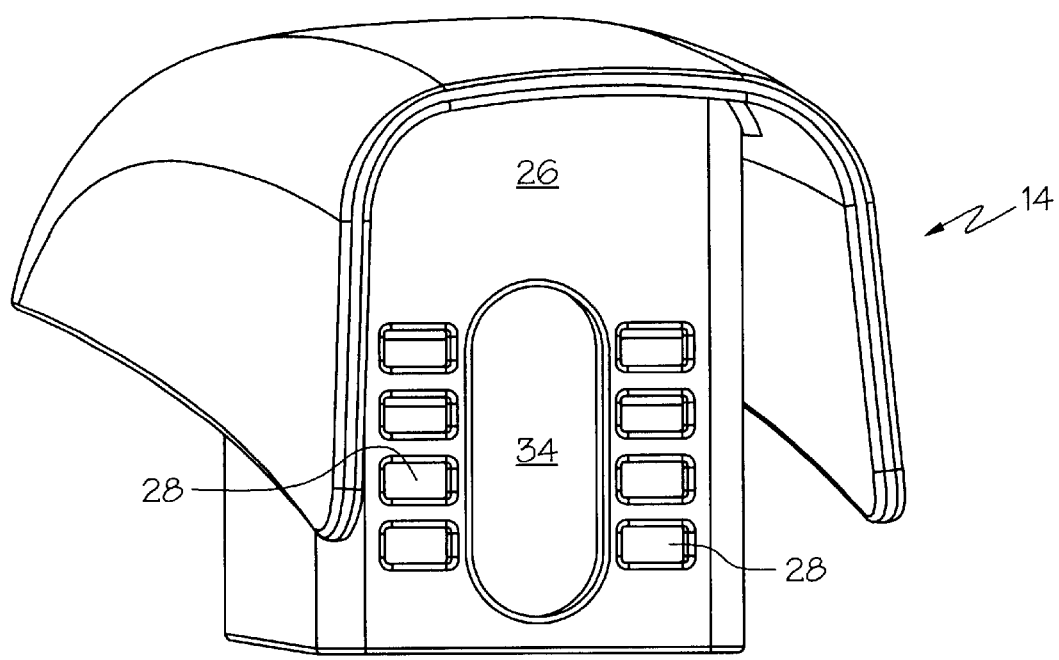
FIG. 4 is a perspective view of the armrest of FIG. 2.

In one variation, the armrest 14 is disposed surroundingly over the boss portion 22 and has a sidewall 26 including a plurality of spaced-apart slots 28 of different slot heights, and the spring tab 24 is biasingly engaged with an aligned one of the slots 28. In one modification, the spring tab 24 is disengagable from the aligned one of the slots 28 allowing the armrest 14 to be manually moved up or down relative to the bracket 16 to bring another one of the slots 28 into alignment with the spring tab 24. In one arrangement, the slots 28 are disposed in a first column, there is also included a second column of slots 28, and the spring tab 24 has a first projection 30 biasingly engaged with an aligned one of the slots 28 of the first column and has a second projection 32 biasingly engaged with an aligned one of the slots 28 of the second column. FIGS. 2 and 4 show each column having four vertically-spaced-apart slots 28. The number of vertically-spaced-apart slots in a column is left to the artisan.

In one construction, the sidewall 26 of the armrest 14 also includes an elongated access hole 34 between the first and second columns, and the spring tab 24 also includes a push button 36 disposed in the elongated access hole 34. In the same or a different construction, the clamp portion 20 of the bracket 16 has first and second arms 40 and 42 which surround the side portion 18 of the shell 12 in a snap fit. In a first example, the side portion 18 of the shell 12 has two attachment nubs 38 (only one of which is shown in FIG. 1), and the first and second arms 40 and 42 each have an attachment hole 44. In this example, the first and second arms 40 and 42 surround the side portion 18 of the shell 12 in a snap fit with the two attachment nubs 38 of the shell 12 engaged one each in a corresponding one of the attachment holes 44 of the first and second arms 40 and 42 of the clamp portion 20 of the bracket 16. In a second example, not shown, the snap fit is accomplished by the side portion of the shell having the attachment holes and the first and second arms having the attachment nubs, as can be appreciated by the artisan.

In one choice of materials, the shell 12 comprises (and in one variation consists essentially of) plastic such as polypropylene. In the same or a different choice of materials, the bracket 16 comprises (and in one variation consists essentially of) plastic such as polypropylene. In the same or a different choice of materials, the armrest 14 comprises (and in one variation structurally consists essentially of) plastic such as polypropylene (with or without an overmold or a covering of a soft foam or a padded fabric).

In operation, the push button 36 is pushed by the user (or a child of suitable age) to disengage the first and second projections 30 and 32 from the corresponding aligned slots 28. With the push button 36 depressed, the armrest 14 is raised or lowered to bring the first and second projections 30 and 32 into height alignment with different slots 28. Then, the push button 36 is released causing the first and second projections 30 and 32 to biasingly engage the different aligned slots 28. The child car seat 10 would have left and right side portions, brackets, and armrests (with only the right side portion 18, the right bracket 16 and the right armrest 14 being described in the text and shown in the figures), as can be appreciated by the artisan.

Other detailed expressions of the embodiment of the figures include, without limitation, having one of the armrest and the bracket with slots and the other with a spring tab which covers a child car seat having the bracket with the slots and the armrest with the spring tab. Other generalized expressions of the embodiment of the figures include, without limitation, an armrest directly or indirectly (such as with the bracket 16) attached to the shell with a height-adjusting arrangement which allows the armrest height to be adjusted or which adjusts the armrest height. The examples, enablements, and applications, etc. of the first expression are equally applicable to the second expression, as is understood by those skilled in the art.

Several benefits and advantages are derived from one or more of the expressions of an embodiment of the invention. Having height-adjustable armrests for a child car seat allows the child car seat to better fit children of different sizes and allows the same car seat to better fit a child as the child grows. Having height-adjustable armrests for a child car seat also allows, in one example, the armrests to be positioned closer to the child-car-seat shell for easier child ingress and egress while allowing the armrests to be positioned at a higher more comfortable position for the child when the child is secured in the child car seat.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A child car seat comprising:
   a) a child car seat shell having a side portion;
   b) a bracket attached to the side portion; and
   c) an armrest attached to the bracket, wherein the armrest is adjustable up and down for height relative to the bracket by movement of the armrest only along a substantially vertical axis and wherein the bracket has a clamp portion attached to the side portion of the shell and has a boss portion extending from the clamp portion, and wherein the boss portion includes a spring tab.

2. A child car seat comprising:
   a) a child-car-seat shell having a side portion;
   b) a bracket attached to the side portion; and
   c) an armrest attached to the bracket, wherein the armrest is adjustable up and down for height relative to the bracket, wherein the bracket has a clamp portion attached to the side portion of the shell and has a boss portion extending from the clamp portion, wherein the boss portion includes a spring tab, wherein the armrest is disposed surroundingly over the boss portion and has a sidewall including a plurality of spaced-apart slots of different slot heights, and wherein the spring tab is biasingly engaged with an aligned one of the slots.

3. The child car seat of claim 2, wherein the spring tab is disengagable from the aligned one of the slots allowing the armrest to be manually moved up or down relative to the bracket to bring another one of the slots into alignment with the spring tab.

4. The child car seat of claim 3, wherein the slots are disposed in a first column and also including a second column of slots, and wherein the spring tab has a first projection biasingly engaged with an aligned one of the slots of the first column and has a second projection biasingly engaged with an aligned one of the slots of the second column.

5. The child car seat of claim 4, wherein the sidewall also includes an elongated access hole between the first and second columns, and wherein the spring tab also includes a push button disposed in the elongated access hole.

6. A child car seat comprising:
   a) a child-car-seat shell having a side portion;
   b) a bracket attached to the side portion; and
   c) an armrest attached to the bracket, wherein the armrest is adjustable up and down for height relative to the bracket,
   wherein the bracket has a clamp portion attached to the side portion of the shell and has a boss portion extending from the clamp portion, and wherein the boss portion includes a spring tab,
   wherein the armrest is disposed surroundingly over the boss portion and has a sidewall including a plurality of spaced-apart slots of different slot heights, and wherein the spring tab is biasingly engaged with an aligned one of the slots,
   wherein the spring tab is disengagable from the aligned one of the slots allowing the armrest to be manually moved up or down relative to the bracket to bring another one of the slots into alignment with the spring tab,
   wherein the slots are disposed in a first column and also including a second column of slots, and wherein the spring tab has a first projection biasingly engaged with an aligned one of the slots of the first column and has a second projection biasingly engaged with an aligned one of the slots of the second column,
   wherein the sidewall also includes an elongated access hole between the first and second columns, and wherein the spring tab also includes a push button disposed in the elongated access hole, and
   wherein the clamp portion of the bracket has first and second arms which surround the side portion of the shell in a snap fit.

* * * * *